United States Patent [19]

Udren

[11] 4,377,833
[45] Mar. 22, 1983

[54] METHODS AND APPARATUS FOR PROTECTING ELECTRICAL REACTORS

[75] Inventor: Eric A. Udren, Monroeville, Pa.

[73] Assignee: Electric Power Research Institute, Inc., Palo Alto, Calif.

[21] Appl. No.: 293,536

[22] Filed: Aug. 17, 1981

[51] Int. Cl.³ ............................................... H02H 3/40
[52] U.S. Cl. ..................................... 361/79; 323/211; 361/80; 364/482
[58] Field of Search ........................... 361/35, 79, 80; 364/480, 482, 483; 323/208–211, 222

[56] References Cited

U.S. PATENT DOCUMENTS

| 3,731,152 | 5/1973 | Rockefeller, Jr. | 361/80 |
| 3,989,999 | 11/1976 | Thompson et al. | 323/211 |
| 4,068,159 | 1/1978 | Gyugyi | 323/211 |
| 4,313,169 | 1/1982 | Takagi et al. | 361/80 X |
| 4,344,143 | 8/1982 | Kurosawa et al. | 361/80 X |

Primary Examiner—Harry E. Moose, Jr.
Attorney, Agent, or Firm—D. R. Lackey

[57] ABSTRACT

A method of, and apparatus for, detecting shorted turns in an electrical reactor. The impedance of the reactor, and its rate of change, are monitored. A reduction in impedance which exceeds a predetermined rate of change indicates the impedance change is due to shorted turns, and not to some normal cause, such as temperature.

28 Claims, 10 Drawing Figures

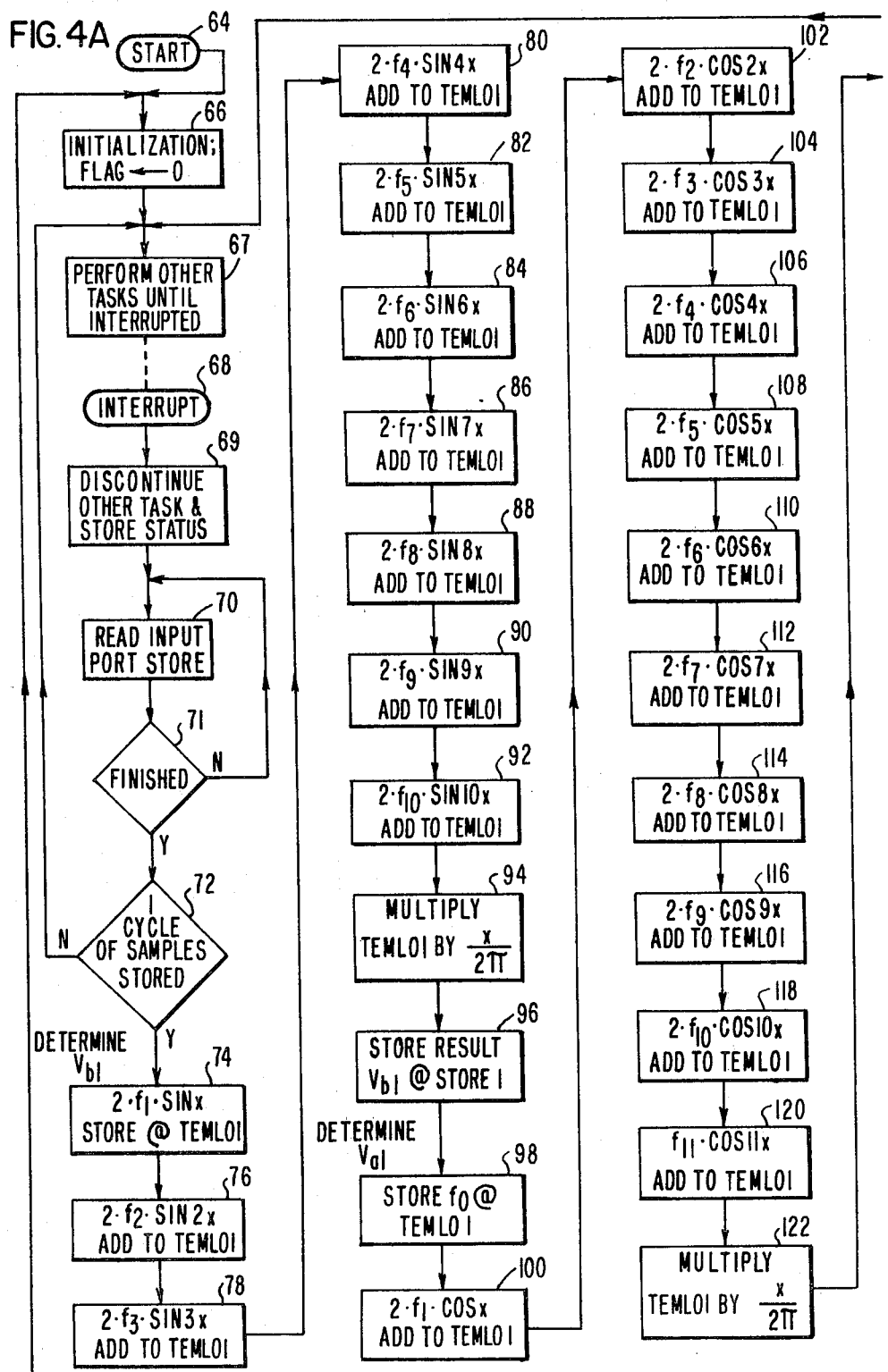

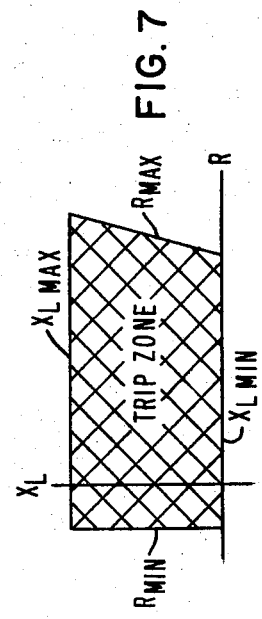
FIG. 7
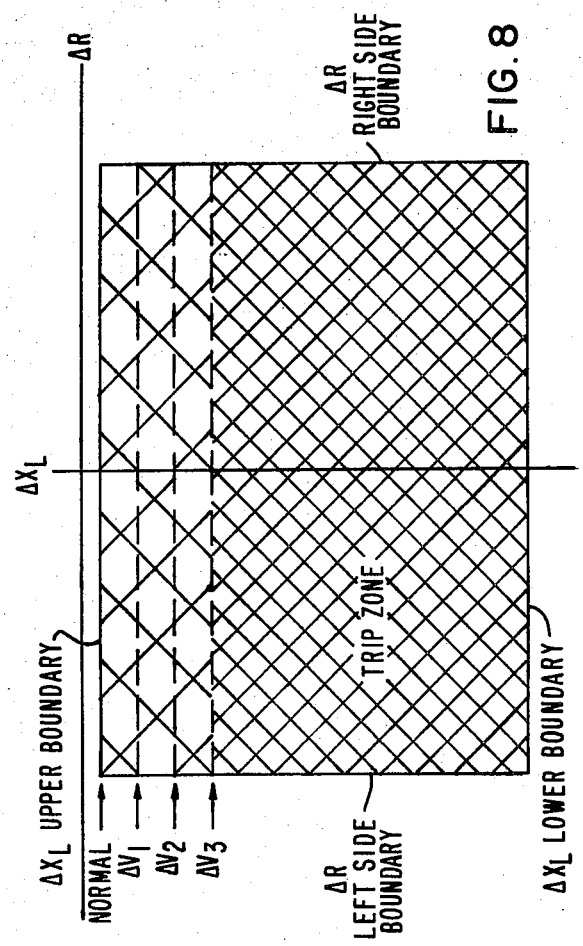
FIG. 8
| ROM MAP LOOK-UP TABLE I | |
|---|---|
| SIN x | COS x |
| SIN 2x | COS 2x |
| ⋮ | ⋮ |
| SIN 10x | COS 10x |
| | COS 11x |
| LOOK-UP TABLE II | |
|---|---|
| $V_L$ VALUES | MAX R VALUES |
| LOOK-UP TABLE III | |
|---|---|
| ΔV | $X_L$ UPPER BOUNDARY |
| ΔV₁ | |
| ΔV₂ | |
| ΔV₃ | |
FIG. 6

METHODS AND APPARATUS FOR PROTECTING ELECTRICAL REACTORS

BACKGROUND OF THE INVENTION

1. Field of the Invention

The invention relates in general to the protection of electrical reactors, and more specifically to the detection of shorted turns in an electrical reactor.

2. Description of the Prior Art

An EHV transmission line produces certain VAR requirements upon the two end systems. These requirements increase as the square of the voltage, and they are a function of the line capacitance and length. If the systems are unable to absorb the VARs with inductive loads or underexcited machines, terminal voltages may rise excessively under light load conditions. A common arrangement for absorbing these VARs is by the use of shunt reactors located near the ends of the EHV line sections. Shunt compensation may be in the form of electrical reactors connected directly to the line being compensated, to the tertiary windings of the step-up or step-down transformers at the terminals of the line, or on the lower voltage bus to which the transformers are connected.

Shunt reactors are conventionally protected in the prior art by a variety of complementary and/or overlapping protective relay functions, including overcurrent, differential, and impedance relays. Overcurrent relays respond to all types of faults, but they have limited sensitivity. Differential relays are very sensitive to winding-to-ground faults, but they do not respond to turn-to-turn faults. Impedance relays, looking into the reactor from the line side, can detect a drop in impedance caused by a turn-to-turn fault, as long as enough turns are shorted. In other words, the impedance relay must be set such that it will not trip the associated circuit breaker, or breakers, for the minimum normal impedance of the reactor. The normal impedance of a reactor varies significantly with heating and voltage. Thus, a turn-to-turn fault which does not drop the reactor impedance below the lower end of the normal impedance range will go undetected. It would thus be desirable to be able to supplement these conventional forms of reactor protection with a protective function which is sensitive to turn-to-turn faults, even when the shorted turns do not drop the impedance below the lower end of the normal impedance range of the protected reactor.

SUMMARY OF THE INVENTION

Briefly, the present invention includes methods of, and apparatus for, detecting shorted turns in an electrical reactor, which methods and apparatus are applicable to any of the shunt reactor protection arrangements, as long as the voltage across, and the current through, the reactor can be measured. In addition to conventional reactor protection arrangements, the rate of change of the reactor impedance is monitored, and it is compared with a predetermined setting. A sudden drop in apparent impedance which exceeds the setting, i.e., the rate of change exceeds a predetermined magnitude, causes a signal to be provided which may be used to trip the local circuit breaker, and to provide a direct transfer trip signal for a remote circuit breaker at the other end of the line section.

When protecting an iron core reactor, the invention also specifically monitors the voltage applied to the reactor. A sudden voltage increase, such as may be caused by external fault clearing, or a switching operation, temporarily modifies the "reach" of the relay's tripping characteristic, to suppress operation due to a drop in apparent impedance caused by a voltage jump, but not for faults. This less sensitive impedance change detection characteristic persists for only about one power cycle, and then the normal boundary of the characteristic is restored. In a preferred embodiment of the invention, this dynamic characteristic or boundary shift is proportional to the magnitude of the voltage increase.

The impedance change detection is disabled upon energization of the reactor for about one power cycle, in order to establish an impedance value required to start the comparison or rate-of-change detection. Auxiliary protection is provided, though not as sensitively, as in addition to the impedance change detection, the invention also compares each impedance determination of the reactor with a fixed impedance characteristic.

The invention also detects when the transmission line is deenergized, to prevent the impedance change detection from generating trip signals due to ring-down of the line.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIGS. 4A, 4B, and 4C may be assembled to provide a detailed program and logic for directing the operation of the protective relay apparatus shown in FIG. 1 according to the teachings and methods of the invention;

FIG. 6 is a ROM map which illustrates suitable formats for various look-up tables used by the program shown in FIGS. 4A, 4B, and 4C;

FIG. 7 is a R-X diagram which illustrates an exemplary operating characteristic of an impedance relaying function of the invention; and FIG. 8 is an impedance change diagram which illustrates an exemplary operating characteristic of the impedance change relaying function of the invention.

DESCRIPTION OF PREFERRED EMBODIMENTS

The present invention relates to new and improved protective relaying methods and apparatus for protecting large shunt electrical reactors of the type used by electrical utilities to provide VAR compensation on EHV transmission lines. In general, the new method includes the steps of providing voltage and current signals representative of the voltage across, and the current through, the reactor to be protected, and determining the apparent impedance of the reactor by using the voltage and current signals. The rate of change of the apparent impedance is then determined and monitored. A percent sudden drop of apparent impedance, which change exceeds a predetermined setting, indicates a turn-to-turn fault.

Figure 1:
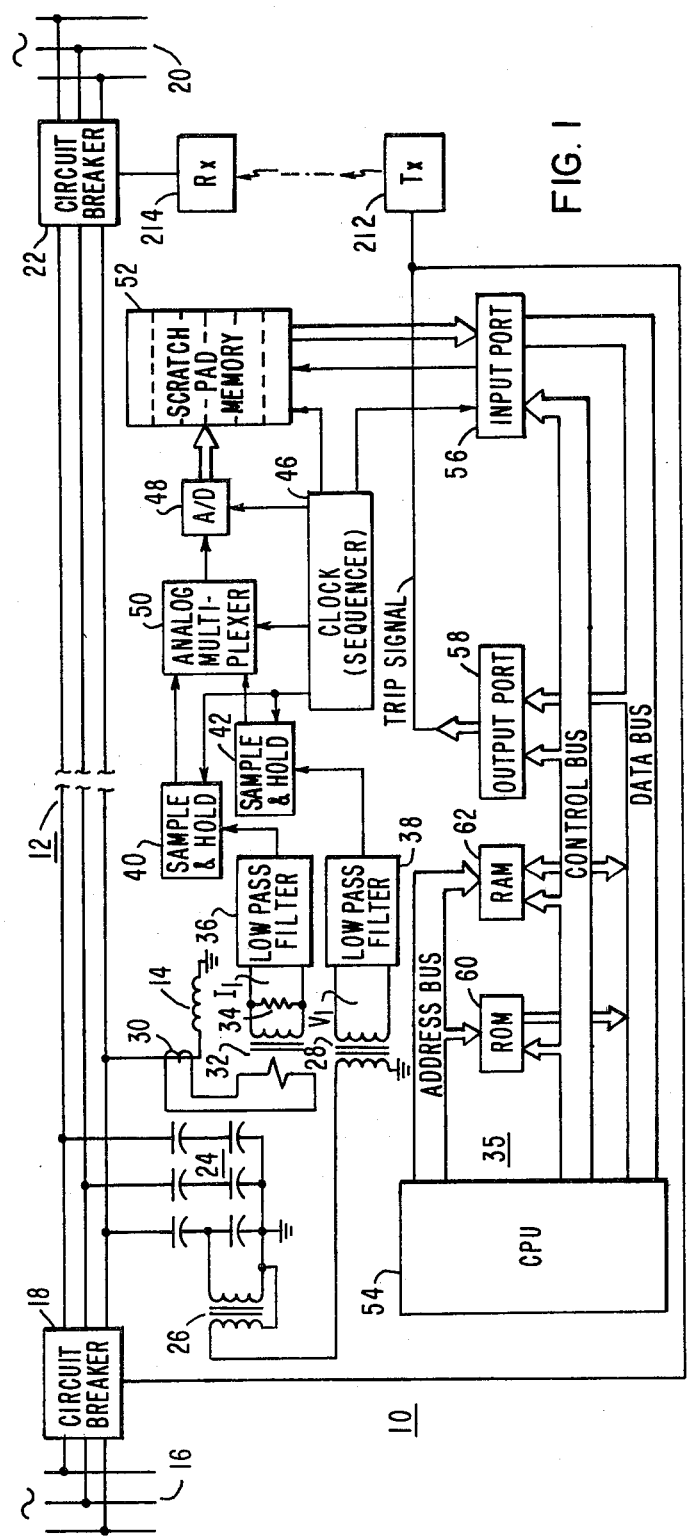
FIG. 1 is a schematic diagram of protective relay apparatus for protecting a shunt reactor according to the teachings of the invention, including very sensitive detection of shorted turns.

FIG. 1 is a schematic diagram of new and improved protective relay apparatus 10 which embodies a preferred implementation of this method, wherein the voltage and current signals are provided at a predetermined sampling rate. Impedance determinations may be made by using these samples, with the impedance determinations being made at the same rate as the sampling rate, or at some predetermined lesser rate. In any event, the impedance determinations are made at a predetermined rate, and each determination is compared with a predetermined prior impedance determination, to determine the rate of change. Since the time between the latest determination and the earlier determination it is compared with will always be the same, the rate of change of impedance can be monitored and compared with a boundary value simply by comparing each difference value in apparent impedance with a predetermined value selected to reflect the maximum allowable rate of change.

Protective relay apparatus 10 is associated with a three-phase electrical power transmission line 12, with VAR compensation being provided for the line by shunt reactors. For purposes of describing the invention, it is sufficient to illustrate a single shunt reactor 14 connected to one of the three phases near the local end of the transmission line. It will be understood that similar reactors would also be connected to the other phases, and that reactors may also be connected at other points of the transmission line, such as near the remote end of the transmission line 12. While shunt reactor 14 is illustrated as being connected directly to the high voltage (HV), or extra high voltage (EHV) line 12, it is to be understood that the invention is equally applicable to protecting tertiary connected reactors, and reactors which are connected to the lower voltage buses. The local end of transmission line 12 is connected to a three-phase bus 16 via three single-phase circuit breakers, or a single three-phase circuit breaker, with the circuit breakers being shown generally at 18. The remote end of transmission line 12 is connected to a three-phase bus 20 via a circuit breaker 22. A source of alternating three-phase electrical potential, usually having a power frequency of 50 or 60 Hz, is connected to at least one of the buses 16 or 20.

It is important to provide information relative to the voltage across, and the current through, reactor 14, measured from the line side. A capacitive type voltage divider 24, a potential transformer 26, and an isolating potential transformer 28, may be used to provide an analog signal $V_1$ proportional to the voltage applied to reactor 14. A current transformer 30 connected to measure the current flowing between reactor 14 and the line, an isolating current transformer 32, and a resistor 34, are connected to provide a signal $I_1$, in voltage form, proportional to the reactor current.

In the preferred embodiment of the invention, the impedance calculations are made with the aid of a digital computer 35, such as a microprocessor, and the logic of the invention is also conveniently implemented by the same digital computer. Thus, the analog voltage and current signals $V_1$ and $I_1$ are converted to digital form for use by the digital computer. However, it is to be understood that the invention may also performed by dedicated solid state circuits.

Figure 2:
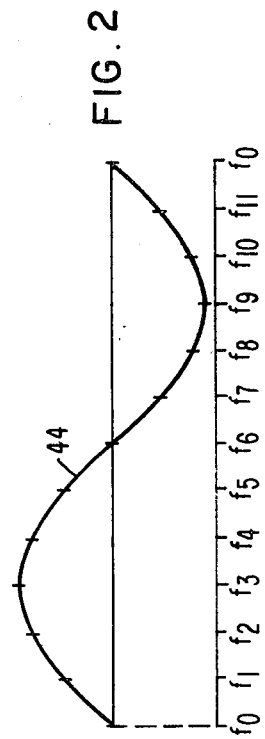
FIG. 2 illustrates a sinusoidal waveform and exemplary sampling intervals which may be used to obtain voltage and current samples used in the determination of reactor impedance.

The voltage and current signals $V_1$ and $I_1$ may be converted to digital form by any suitable process. For example, after the voltage and current signals $V_1$ and $I_1$ are passed through low pass, anti-aliasing filters 36 and 38, respectively, they are applied to sample and hold circuits 40 and 42, respectively. The filter outputs are sampled and held at a predetermined rate, such as 12 or 16 times per power frequency cycle. For purposes of example, the 12 samples per cycle will be assumed, with the waveforms being sampled every 30 degrees. FIG. 2 illustrates a sinusoidal waveform 44 and twelve uniformly spaced sampling points referenced $f_0$ through $f_{11}$. While the Figure illustrates the samples in-phase with the waveform, i.e., starting at a zero point, in practice no attempt is made, or required, to synchronize the sampling with the waveform it is sampling.

Figure 3:
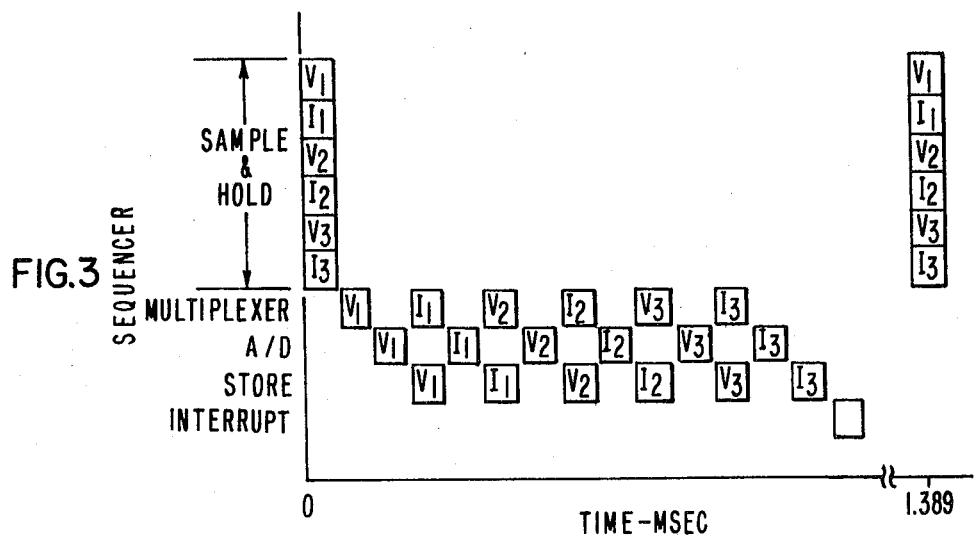
FIG. 3 is a graph which illustrates how a clock sequencer shown in FIG. 1 controls the transfer of the voltage and current samples in the protective relay apparatus shown in FIG. 1.

A clock 46, also called a sequencer, provides the signals for operating the sample and hold circuits 40 and 42, as well as the signals for further processing of the sampled and held signals. FIG. 3 is an exemplary timing diagram which illustrates the sequencing of the various functions. FIG. 3 illustrates the sample and hold functions simultaneously sampling and holding the voltage and current waveforms of all three phases, to make it clear that the samples being processed are taken simultaneously, and that there is adequate time between samples to process the signals from all three phases.

Since analog to digital converters are relatively costly, the analog voltage and current samples may be multiplexed through a single A/D converter 48 via an analog multiplexer 50. The output of the A/D converter stores each of the voltage and current samples in digital form in a search pad memory 52. Thus, as shown in FIG. 3, the sequencer 46, after providing signals for the sample and hold functions, provides a signal for the analog multiplexer which connects the output of one of the sample and hold functions to the input of the A/D converter 48. The sequencer then provides a signal for the A/D converter to perform the conversion, and a signal from the sequencer 46 stores the digitized value at the next empty location in memory 52. The multiplexing, the A/D converting, and storing signals are repeated until all sampled and held values are stored in memory 52.

Computer 35 includes a central processing unit or CPU 54, an input port 56, an output port 58, a read-only memory or ROM 60, and a random access memory or RAM 62.

After all of the sampled and held values of the present sampling period are stored in memory 52, the sequencer 46 provides an interrupt signal for the input port 56 of computer 35. The input port 56 reads the first memory word and stores it in RAM 62, and it then provides a signal for memory 52 to put the next binary word on its output bus, etc., until all of the memory words have been transferred into RAM 62. Sequencer 46 repeats the process every 1.389 ms to provide the 12 samples per 60 Hz power cycle selected for purposes of example. Instead of using interrupts as the mode for transferring the data, other techniques, such as polling, or direct memory access (dma), may be used.

Figure 5:
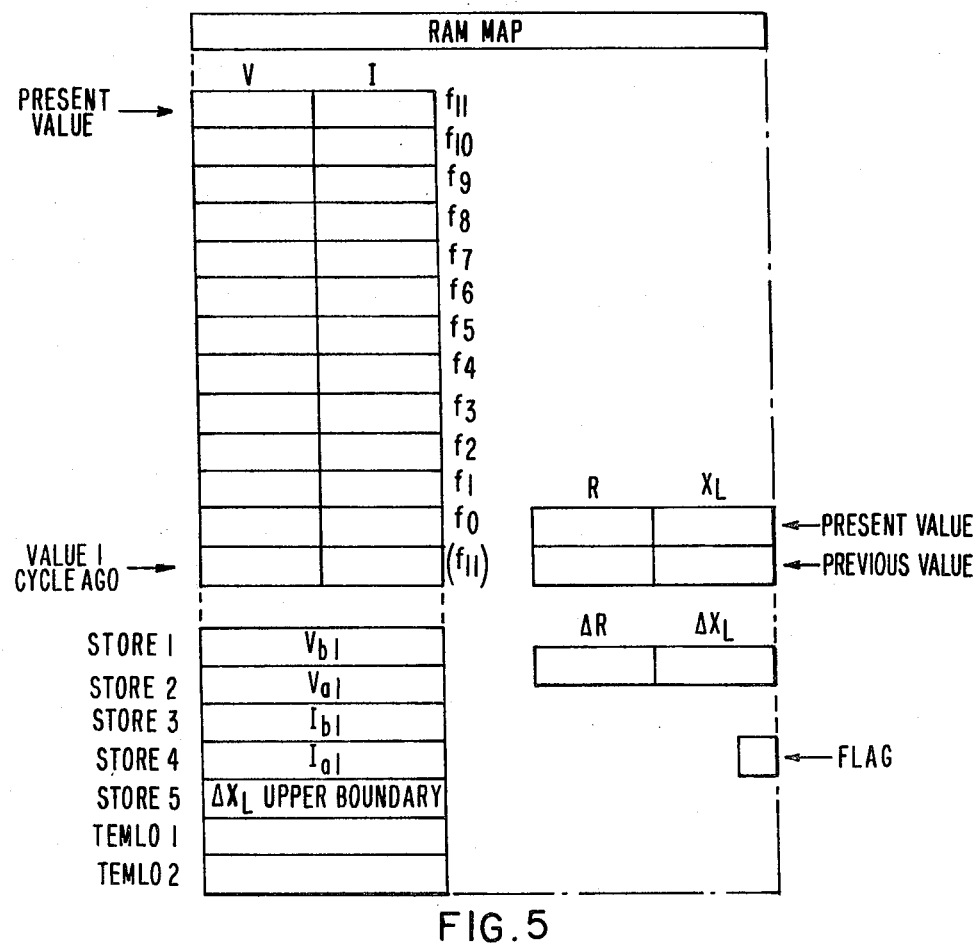
FIG. 5 is a RAM map which illustrates a suitable format for certain of the monitored data, and information developed by the program shown in FIGS. 4A, 4B, and 4C.
Figure 4B:
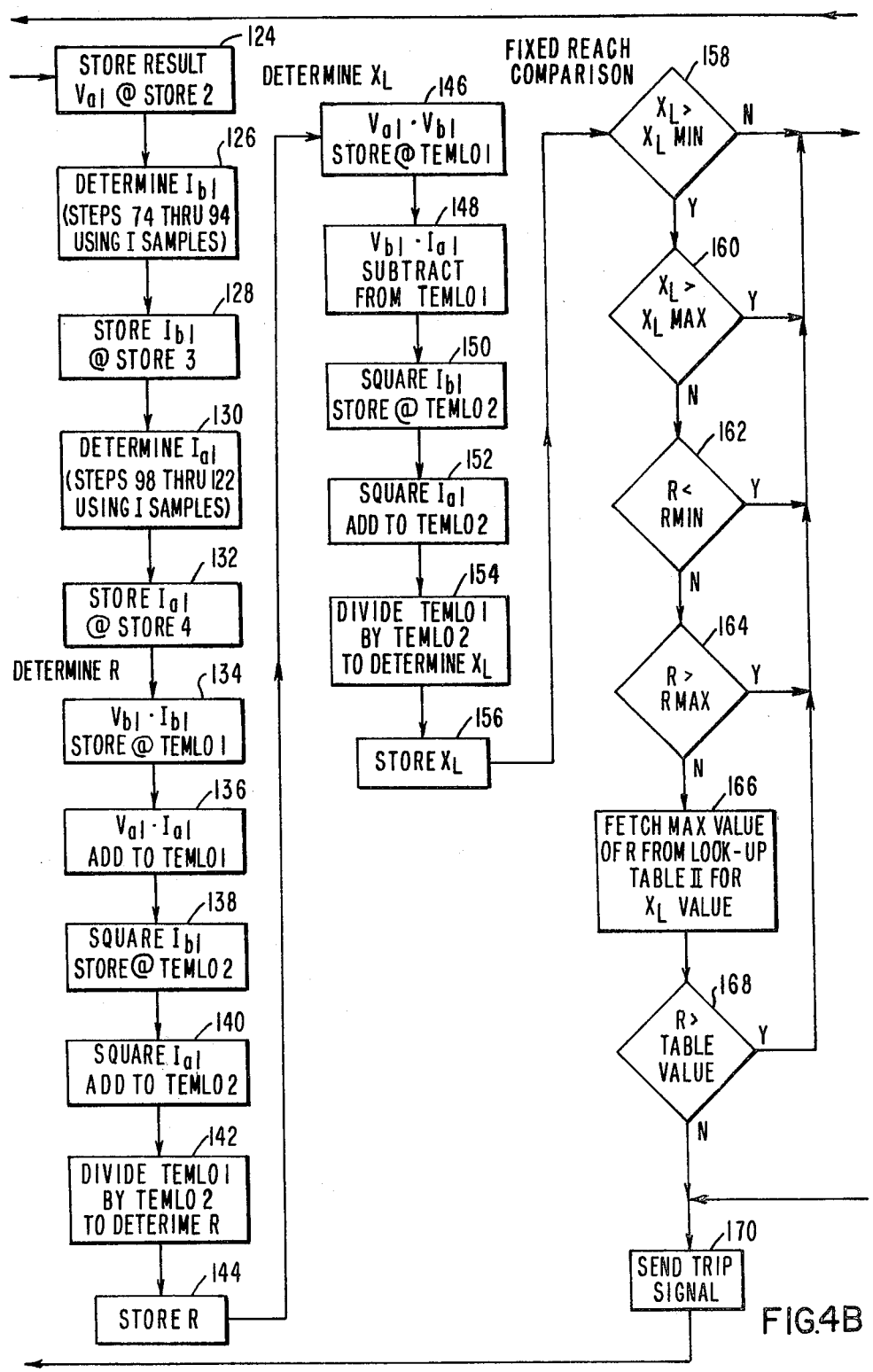
Figure 4C:
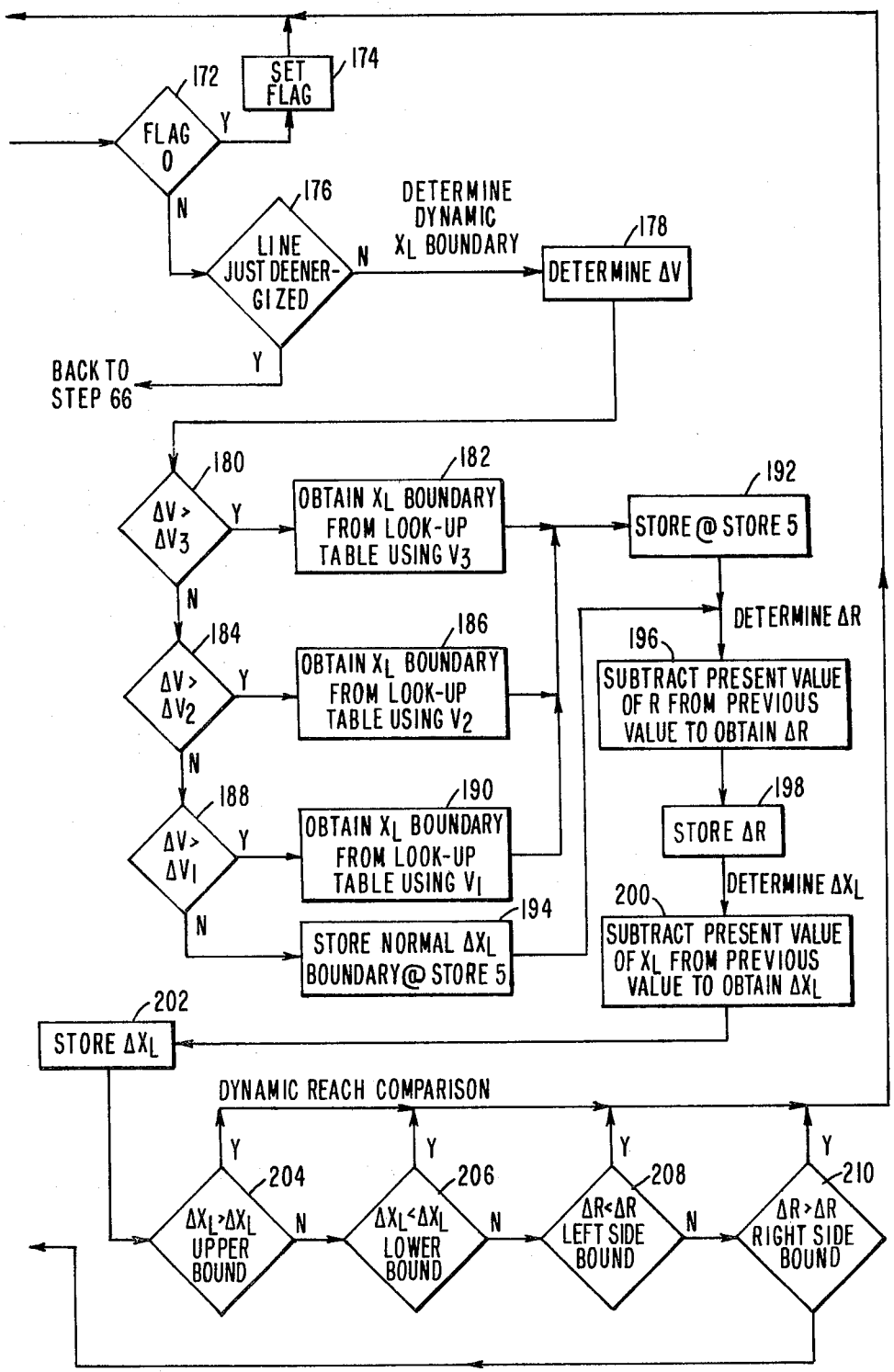

FIGS. 4A, 4B, and 4C may be assembled to provide a detailed flow chart which may be used to write a program for the digital computer 35 to implement the teachings of the invention. The program is entered at 64 and step 66 initializes the system, such as by clearing certain memories, clearing flags, etc. The program may then serve other tasks, as indicated by step 67. When samples are ready for transfer, an interrupt is provided by sequencer 46 and the computer 35 goes into an interrupt service program, indicated by step 69. This program stops performing the other task and stores its status, to enable an orderly return thereto. Step 70 then reads the input port 56 and stores the word in RAM 62. Step 71 checks to see if all of the memory words stored in memory 52 have been transferred. If not, the program loops through steps 70 and 71 until the memory has been emptied. FIG. 5 is a RAM map which illustrates a suitable format for storing the voltage and current samples of one of the phases.

The invention utilizes an algorithm for determining the apparent impedance of the reactor from the voltage and current samples. Any suitable algorithm may be used, and, as such, forms no part of the present invention. In order to provide secure, unambiguous results, a long window, i.e., full cycle, algorithm is preferred, such as the full cycle Fourier of Walsh algorithms. For purposes of example, the full cycle Fourier algorithms disclosed by G. R. Slemon et al. in a paper entitled "High Speed Protection Of Power Systems Based On Improved Power System Models", CIGRE 31-09, 1968, will be used. For easier computation, the polar form disclosed in this paper may be converted to rectangular form, with the equations for the resistance r and reactance $X_L$ in rectangular form being as follows:

$$R = \frac{V_{b1}I_{b1} + V_{a1}I_{a1}}{I_{b1}^2 + I_{a1}^2} \quad (1)$$

$$X_L = \frac{V_{a1}I_{b1} - V_{b1}I_{a1}}{I_{b1}^2 + I_{a1}^2} \quad (2)$$

The b1 and a1 quantities for the voltage and current in equations (1) and (2) are determined from equations (8) of the hereinbefore mentioned paper, as follows:

$$a1 = \frac{x}{2\pi}(f_o + 2f_1 \cos x + 2f_2 \cos 2x + \ldots \quad (3)$$
$$2f_{n-1} \cos(n-1)x + f_n \cos nx)$$

$$b1 = \frac{x}{2\pi}(2f_1 \sin x + 2f_2 \sin 2x + \ldots \quad (4)$$
$$2f_{n-1} \sin(n-1)x)$$

In the above equations, x is the sampling interval in radians, n is equal to $2\pi/x$, and $f_0, f_1 \ldots f_n$ are the amplitudes of the voltage and current waveforms at the sampling instants, which are stored in RAM 62, as hereinbefore described. The sin and cos elements are constants, and need not be calculated. For example, as shown in FIG. 6, which is a ROM map of ROM 60, these constants may be stored in a look-up table, referenced Look-Up Table I.

The sampling interval chosen for purposes of example is 360°/12 or 30 degrees, which is $\pi/6$ radians. Thus, x is equal to $\pi/6$.

In the above equations, n, which is equal to $2\pi/x$, is thus equal to 12. Sin x, which is sin 30°, is equal to 0.5. Sin 2x, which is sin 60° is equal to 0.866, etc. Cos x, which is cos 30°, is equal to 0.866, cos 2x, which is cos 60°, is equal to 0.5, etc. The sin and cos constants for each multiple of 30° through 360° would be stored in Look-Up Table I.

Thus, in order to determine R and $X_L$, twelve voltage and current samples are required, which are obtained during one power cycle. Step 72 checks to see if one complete cycle of samples have been stored. If not, the program returns to step 67. When step 72 finds that all 12 samples $f_0$ through $f_{11}$ have been collected, the program advances from step 72 to step 74. Step 74 starts algorithm (4), using the voltage samples $f_0-f_{11}$ stored in RAM 62, as shown in FIG. 5.

Step 74 determines the first element $2f_1 \sin x$ of equation (4), looking up the value for sin x (sin 30°) in Look-Up Table I, and multiplying this value (0.5) by the value of the voltage sample $f_1$, and it then multiplies the resulting product by two. The result is stored at a temporary location in RAM 62, referenced TEMLO 1, as illustrated in the RAM map of FIG. 5.

Step 76 looks up sin 2x (sin 60) and multiplies this value (0.866) by the voltage sample $f_2$, and the resulting product is then multiplied by two. The result is added to the value stored at TEMLO 1. Steps 78, 80, 82, 84, 86, 88, 90 and 92 each determine another quantity of equation (4), with each step adding the result to the contents of location TEMLO 1. Step 94 then multiplies the contents of TEMLO 1 by $x/2\pi$ (1/12). Step 94 stores the result, which is $V_{b1}$ at a location in RAM 62 referenced STORE 1. This location is set forth in the RAM map of FIG. 5.

In like manner, $V_{a1}$ is determined using equation (3), and the voltage samples $f_0-f_{11}$. Steps 98 through 124 set forth the required operations in detail, following equation (3) just as equation (4) was followed by steps 74 through 96. Step 124 stores $V_{a1}$ at location STORE 2, which is shown in the RAM map of FIG. 5.

Step 126 then determines $I_{b1}$ by using equation (4) and the samples $f_0-f_{11}$ of the current samples, which are stored in RAM 62. Thus, step 126 is performed using steps similar to steps 74 through 94, and these steps need not be repeated in detail. Step 128 then stores $I_{b1}$ at location STORE 3 of RAM 62.

Step 130 then determines $I_{a1}$ by using equation (3) and the samples $f_0-f_{11}$ responsive to the reactor current, which are stored in RAM 62. Step 130 is then performed using steps similar to steps 98 through 122, and thus these steps need not be repeated in detail. Step 132 stores $I_{a1}$ at location STORE 4.

At this point of the program $V_{b1}, V_{a1}, I_{b1}$ and $I_{a1}$ have been determined and stored for future use. The program then determines the apparent resistance R of the reactor 14 using equation (1). Step 134 multiplies $V_{b1}$ by $I_{b1}$ and stores the product at TEMLO 1. Step 136 multiples $V_{a1}$ by $I_{a1}$ and adds the product to the contents of location TEMLO 1. Step 138 squares $I_{b1}$ and stores the result at TEMLO 2. Step 140 squares $I_{a1}$ and adds the result to the contents of location TEMLO 2. Step 142 divides the contents of TEMLO 1 by the contents of TEMLO 2, to determine the apparent resistance R. Step 144 stores the value representative of R in RAM 62, as shown in FIG. 5.

Steps 146 through 154 now determine $X_L$, using equation (2), with step 146 multiplying $V_{a1}$ by $V_{b1}$, and storing the product at TEMLO 1. Step 148 multiplies $V_{b1}$ by $I_{a1}$ and subtracts the result from the contents of TEMLO 1. Step 150 squares $I_{b1}$ and stores the result at TEMLO 2. Step 152 squares $I_{a1}$ and adds the result to the contents of location TEMLO 2. Step 154 divides the contents of TEMLO 1 by the contents of TEMLO 2, to produce $X_L$. Step 156 stores $X_L$ in RAM 62, as shown in FIG. 5.

Now that the rectangular coordinates for the apparent impedance of the reactor have been determined, a first protective function may be performed, which function involves a fixed reach comparison. This protective function is not as sensitive as a later protective function which will be performed, but it will detect all faults except those turn-to-turn faults which short too few turns to drop the apparent impedance of the reactor into a range outside the normal impedance range of the reactor.

FIG. 7 is a R-X diagram illustrating a suitable characteristic for making an impedance decision relative to a shunt reactor. If the point described by R, $X_L$ falls within the trip zone, it indicates that the impedance of the reactor is below a predetermined minimum value, and the reactor should be deenergized. The trip zone is bounded by boundaries $X_L$ min, $X_L$ max, R min and R max. Boundaries $X_L$ min, $X_L$ max and R min are constants, while R max is a variable, with its value being dependent upon the value of $X_L$.

Steps 158 through 168 determine if the present values of R and $X_L$ fall within the trip zone, with step 158 comparing $X_L$ with $X_L$ min. If $X_L$ is less than $X_L$ min, the impedance cannot fall within the trip zone, and the program terminates the fixed reach comparison function by advancing to step 172. If $X_L$ is greater than or equal to $X_L$ min, step 160 checks to see if $X_L$ exceeds the $X_L$ max boundary. If it does, the impedance is outside the trip zone and the program advances to step 172. If $X_L$ is less than or equal to $X_L$ max, step 162 checks to see is R is less than the R min boundary. If it is less, the impedance is outside the trip zone, and step 162 advances to step 172. If R exceeds, or is equal to, R min, step 164 checks to see if R is greater than the largest value for boundary R max. If it is, the impedance is outside the trip zone, and step 164 advances to step 172. If R is less than, or equal to, this maximum value of R max, the value of R max for the specific value of $X_L$ may be obtained from a look-up table in ROM 60, such as Look-Up Table II shown in FIG. 6. The curve R max is defined in this Table. Alternatively, the equation for the curve R max may be solved to determine R from the $X_L$ value. Step 168 compares R with the value obtained from the Look-Up Table. If R exceeds this value, the apparent impedance of the reactor is outside the trip zone, and the program advances to step 172. If R is less than, or equal to, this value, the program advances to step 170, which prepares a trip signal for the local and remote circuit breakers 18 and 22, to deenergize reactor 14. The trip signal is sent to the output port 58, and from the output port to the trip circuit of the local circuit breaker 18. A direct transfer trip of the remote circuit breaker 22 is made by sending the trip signal to the trip circuit of the remote circuit breaker. This may be accomplished via any suitable communication link, such as power line carrier, a dedicated telephone line, or microwave. FIG. 1 illustrates the trip signal keying a transmitter 212, which transmits a trip signal to a receiver 214 associated with the remote circuit breakers 22. If a trip signal is generated, the program may exit, or simply return to step 66 for looping through steps 66 and 68 until the reactor is reenergized.

If the fixed reach comparison function does not detect a fault and produce a trip signal, the program advances to step 172 which checks to see if this is the first run through the program following the initialization step. If it is, the flag shown in FIG. 5 will be a zero, and it is thus known that there will be insufficient data to perform the next protective function of the invention. When step 172 finds the flag reset, step 174 sets the flag and the program returns to step 67 to await the next interrupt.

The next comparison function of the invention compares the present value of the apparent reactor impedance with a value found and stored in RAM 62 on an earlier determination. The next determination of R and $X_L$ can use 12 new samples for this determination, and thus R and $X_L$ would be determined once each power cycle, i.e., every 16.67 ms, or, once the first 12 samples have been received, new R and $X_L$ determinations may be made every time new V and I samples are received, i.e., every 1.389 ms, by adding the latest signal to the group of 12 and dropping the oldest signal of the group of 12, with this new group of 12 signals being used to make the determination. Thus, the change in apparent impedance of the reactor may be checked every 1.389 ms by comparing the latest impedance with that calculated during the immediately preceding calculation. Since an earlier detection of a fault may be made by determining the reactor impedance, and the change in reactor impedance, each time new voltage and current samples are received, the program set forth in FIGS. 4A, 4B and 4C implement this embodiment of the invention. Thus, after the initial power cycle, step 72 will always find that 12 samples are stored, with the storage format always storing the latest sample and deleting the oldest, to maintain the latest 12 samples for the algorithms. As shown in FIG. 5, at least the value of the voltage one complete cycle ago may also be saved, for implementing a desirable embodiment of the invention which will be hereinafter described.

If the transmission line has just been deenergized, it would not be desirable to perform the next protective function of the invention, because low frequency oscillations or ring-down upon line deenergization may cause false operation of the impedance change function. Thus, step 176 checks to see if the line has just been deenergized. This determination may be made by checking voltage, a combination of voltage and line current, voltage and current plus local breaker status, or by detecting that the line voltage or reactor current has assumed a frequency which is substantially different than 60 Hz. Instead of blocking the impedance change function upon detection of line deenergization, it would also be suitable to perform the impedance change function after adjusting the computed impedance to compensate for ring-down.

In the present embodiment, the impedance change function is not performed if step 176 detects that the transmission line has been deenergized, and the program may simply return to step 66 to loop through steps 66 and 68 until the line is again energized.

If step 176 does not detect line deenergization, the program enters a phase which is especially desirable when the shunt reactor 14 being protected is an iron core reactor. An increase in line voltage, such as due to switching operations or external fault clearing, can cause the apparent impedance of an iron core reactor to decrease. Thus, instead of determining the change in impedance and comparing it with a fixed characteristic, the next program portion detects voltage increases and adjusts the characteristic according to the magnitude of the increase. The characteristic is thus a dynamic characteristic, enabling much greater sensitivity to be achieved, as a fixed characteristic would have to be chosen to prevent misoperation due to drops in apparent impedance due to voltage increases. The modified characteristic is immediately returned to its normal value, as soon as the voltage returns to normal, which will usually be within a single power cycle.

More specifically, step 178 subtracts the voltage sample from the voltage sample precisely one cycle earlier, which value may be retained in RAM 62, as shown in FIG. 5. A positive voltage change $\Delta V$ indicates a voltage increase. Using the impedance versus voltage characteristic of the reactor being protected, a look-up Table may be stored in ROM, such as Look-Up Table III shown in FIG. 6, to determine the correct modification which should be made for the specific voltage change.

FIG. 8 is a $\Delta R$-$\Delta X_L$ diagram which sets forth a suitable characteristic for the impedance change function. Line voltage increases may be compensated for by requiring a greater reduction in $\Delta X_L$ to cause tripping. For example, if $\Delta V$ exceeds a predetermined maximum value $\Delta V_3$ the $\Delta X_L$ upper boundary shown in FIG. 8 should be lowered by the maximum amount, to the broken line reference $\Delta V_3$ in FIG. 8. If $\Delta V$ is less than $\Delta V_3$ but greater than a value $\Delta V_2$, the $\Delta X_L$ upper boundary should not be lowered quite as much, such as to the broken line reference $\Delta V_2$ in FIG. 8. If $\Delta V$ is less than $\Delta V_2$ but greater than a value $\Delta V_1$, the $\Delta X_L$ upper boundary should be lowered by a still lesser amount, to the broken line referenced $\Delta V_1$. If $\Delta V$ does not exceed $\Delta V_1$, no modification will be made to the upper $\Delta X_L$ upper boundary, and it will thus be in the position of the solid line referenced "normal". Of course, a different number of modification steps may be used, depending upon the change in impedance with voltage for the specific reactor being protected. If the reactor being protected is an air core reactor, the reactor impedance does not drop significantly with a voltage increase, and the tailoring of the $\Delta R$-$\Delta X_L$ characteristic need not be performed.

Steps 180, 184 and 188 successively compare $\Delta V$ with magnitudes $\Delta V_3$, $\Delta V_2$ and $\Delta V_1$, respectively, and steps 182, 186 and 190, respectively, obtain the upper $\Delta X_L$ boundary to be used when one of these steps finds that $\Delta V$ exceeds the comparison value. Steps 182, 186 and 190 each proceed to step 192, which step stores the value obtained from Look-Up Table III at a location STORE 5 in RAM 62, as shown in FIG. 5. If steps 180, 184 and 188 all find $\Delta V$ to be less than the comparison values, step 194 stores the normal value for the upper boundary of $\Delta X_L$ at location STORE 5.

The impedance change function is now performed, with step 196 subtracting the present value of the resistance component of the reactor impedance from the previous value, to obtain $\Delta R$. Step 198 stores $\Delta R$ in RAM 62, as shown in FIG. 5. Step 200 subtracts the present value of the reactive component $X_L$ of the reactor impedance from the previous value, to obtain $\Delta X_L$. A drop in the reactive component will be a negative number, with step 202 storing $\Delta X_L$ in RAM 62, as shown in FIG. 5.

A dynamic reach comparison is now made wherein the change in impedance is compared with the characteristic defined by the $\Delta R$-$\Delta X_L$ diagram of FIG. 8. A point defined by the present value of $\Delta R$-$\Delta X_L$ which falls within the trip zone indicates a rate of change, or percent drop, which exceeds those which can occur normally, such as due to temperature changes or voltage increases. Changes due to the shorting of turns occur rapidly and produce a rate of change or percent drop within the trip zone of the FIG. 8 characteristic. This rate-of-change detection is independent of the actual values of R and $X_L$, and can thus detect the shorting of turns even when the apparent impedance of the reactor is within its normal operating range.

More specifically, step 204 compares $\Delta X_L$ with the upper boundary of the $\Delta X_L$ characteristic, obtaining this value from location STORE 5 of RAM 62. If $\Delta X_L$ exceeds, i.e., is more positive, than the $\Delta X_L$ upper boundary, the impedance cannot be within the trip zone and the program returns to step 67 to await the next interrupt. If $\Delta X_L$ is not more positive than the upper boundary, steps 206 checks to see if $\Delta X_L$ is less than, i.e., more negative, than the $\Delta X_L$ lower boundary. If it is more negative, the impedance cannot be within the trip zone, and the program returns to step 68. If $\Delta X_L$ is more positive than the lower boundary, step 208 checks $\Delta R$ to see if it is less than, i.e., more negative, than the $\Delta R$ constant which defines the left side boundary of the characteristic. If it is more negative, the reactor impedance cannot fall with the trip zone, and the program returns to step 68. If it is not more negative, step 210 checks to see if $\Delta R$ is greater than, i.e., more positive, than the $\Delta R$ constant which defines the right side boundary. If it is greater, the impedance is outside the trip zone. If it is not greater, the impedance lies within the trip zone and the program returns to step 170 to prepare trip signals for the circuit breakers, as hereinbefore described.

While the invention has been described using the impedance, and the rate of change of the impedance, of the reactor, which is the preferred embodiment, it is to be understood that the reactance, and the rate of change of reactance, may be used. This embodiment would be implemented by merely omitting the steps in FIGS. 4A, 4B and 4C which check the resistance boundaries.

In summary, there has been disclosed new and improved methods and apparatus for protecting shunt reactors, which methods and apparatus detect shorted turns with a sensitivity not achievable by prior art protective methods and apparatus. By comparing the rate of change, or percent drop, of the reactor impedance with a predetermined value, turn-to-turn faults are detectable, even when the impedance of the reactor is within its normal range.

I claim as my invention:

1. A method of detecting shorted turns in an electrical reactor, comprising the steps of:
    providing voltage and current signals representative of the voltage across and the current through, the electrical reactor, respectively,
    determining the apparent electrical impedance of the reactor from the voltage and current signals,
    determining the rate of change of the apparent electrical impedance of the reactor,
    and detecting when the rate of change of a decrease in apparent impedance exceeds a predetermined magnitude.

2. The method of claim 1 including the step of monitoring the magnitude of the voltage signal, prior to the detecting step, and modifying the predetermined impedance range used in the detecting step when the monitoring step detects a voltage increase.

3. The method of claim 1 wherein the impedance has a resistive component R and a reactive component $X_L$, and including the step of defining the predetermined electrical impedance range of impedance change with $\Delta R$ and $\Delta X_L$ boundaries responsive to the change in the resistance component R, and to the change in the reactive component $X_L$, respectively.

4. The method of claim 3 wherein the predetermined range is a dynamic range, including the step of monitoring the magnitude of the voltage signal prior to the detecting step, and modifying a predetermined $\Delta X_L$ boundary of the impedance range when the monitoring step detects a voltage increase, to require a greater change in $X_L$ before the impedance change falls within the dynamic range indicative of a fault in the reactor.

5. The method of claim 4 wherein the monitoring step provides an indication of the magnitude of a voltage increase, with the modifying step modifying the $\Delta X_L$ boundary by a factor proportional to the magnitude of the voltage increase.

6. The method of claim 1 wherein the step of providing the voltage and current signals includes the step of providing them in digital form at a predetermined uniform sampling rate, with the step of determining the electrical impedance of the reactor repetitively determining the impedance at the sampling rate.

7. The method of claim 6 wherein the step of determining the rate of change of the electrical impedance compares predetermined successive determinations of the impedance.

8. The method of claim 1 wherein the predetermined impedance range is a dynamic range, with modification thereof including the steps of comparing the magnitude of the present voltage signal with its magnitude one electrical cycle earlier, and modifying at least one predetermined boundary of the dynamic range, prior to the detecting step, when the comparison step indicates a voltage increase of at least a predetermined magnitude.

9. The method of claim 1 including the step of detecting when the electrical impedance of the reactor falls within a predetermined range.

10. The method of claim 1 wherein the step of determining the electrical impedance provides such determinations at a predetermined rate, and the step of determining the rate of change includes the step of comparing the last impedance determination with the immediately prior impedance determination.

11. Apparatus for protecting an electrical reactor connected to a source of alternating potential via a circuit breaker, comprising:
first means for providing voltage and current signals responsive to the voltage across, and the current through the electrical reactor,
second means responsive to said first means for providing signals indicative of the apparent impedance of the electrical reactor,
third means responsive to said second means for providing a signal responsive to the rate of change of the apparent impedance,
and fourth means responsive to said third means for providing a trip signal for the circuit breaker when the rate of change of a drop in apparent impedance falls within a predetermined range.

12. The apparatus of claim 11 including means responsive to the second means for providing a trip signal for the circuit breaker when the apparent impedance of the electrical reactor falls within a predetermined range.

13. The apparatus of claim 11 including means for modifying the predetermined range, with said means including means for monitoring the voltage, and means for temporarily modifying the predetermined range in response to the voltage monitoring means detecting a predetermined voltage increase over a predetermined period of time, wherein a greater rate of change of the impedance is required during the temporary modification in order for the fourth means to provide a trip signal.

14. The apparatus of claim 11 wherein the first means provides the voltage and current signals in digital form, at a predetermined sampling rate, the second means provides indications of the apparent impedance at the predetermined sampling rate, and the third means provides a signal responsive to the rate of change of the apparent impedance by detecting the change in impedance from one determination thereof to the next.

15. A method of detecting shorted turns in an electrical reactor, comprising the steps of:
providing voltage and current signals representative of the voltage across and the current through, the electrical reactor, respectively,
determining the apparent electrical reactance of the reactor from the voltage and current signals,
determining the rate of change of the apparent electrical reactance of the reactor,
and detecting when the rate of change of a decrease in apparent reactance exceeds a predetermined magnitude.

16. The method of claim 15 including the step of monitoring the magnitude of the voltage signal, prior to the detecting step, and modifying the predetermined reactance range used in the detecting step when the monitoring step detects a voltage increase.

17. The method of claim 15 wherein the electrical reactor has an impedance having a resistive component R and a reactive component $X_L$, and including the step of defining the predetermined electrical reactance range of reactance change with $\Delta X_L$ boundaries responsive to the change in the reactive component $X_L$.

18. The method of claim 17 wherein the predetermined range is a dynamic range, including the step of monitoring the magnitude of the voltage signal prior to the detecting step, and modifying a predetermined $\Delta X_L$ boundary of the reactance range when the monitoring step detects a voltage increase, to require a greater change in $X_L$ before the impedance change falls within the dynamic range indicative of a fault in the reactor.

19. The method of claim 18 wherein the monitoring step provides an indication of the magnitude of a voltage increase, with the modifying step modifying the $\Delta X_L$ boundary by a factor proportional to the magnitude of the voltage increase.

20. The method of claim 15 wherein the step of providing the voltage and current signals includes the step of providing them in digital form at a predetermined uniform sampling rate, with the step of determining the electrical reactance of the reactor repetitively determining the reactance at the sampling rate.

21. The method of claim 20 wherein the step of determining the rate of change of the electrical reactance compares predetermined successive determinations of the reactance.

22. The method of claim 15 wherein the predetermined reactance range is a dynamic range, with modification thereof including the steps of comparing the magnitude of the present voltage signal with its magnitude one electrical cycle earlier, and modifying at least one predetermined boundary of the dynamic range, prior to the detecting step, when the comparison step indicates a voltage increase of at least a predetermined magnitude.

23. The method of claim 15 including the step of detecting when the electrical reactance of the reactor falls within a predetermined range.

24. The method of claim 15 wherein the step of determining the electrical reactance provides such determinations at a predetermined rate, and the step of determining the rate of change includes the step of comparing the last reactance determination with the immediately prior reactance determination.

25. Apparatus for protecting an electrical reactor connected to a source of alternating potential via a circuit breaker, comprising:

first means for providing voltage and current signals responsive to the voltage across, and the current through, the electrical reactor, second means responsive to said first means for providing signals indicative of the apparent reactance of the electrical reactor, third means responsive to said second means for providing a signal responsive to the rate of change of the apparent reactance, and fourth means responsive to said third means for providing a trip signal for the circuit breaker when the rate of change of a drop in apparent reactance falls within a predetermined range.

26. The apparatus of claim 25 including means responsive to the second means for providing a trip signal for the circuit breaker when the apparent reactance of the electrical reactor falls within a predetermined range.

27. The apparatus of claim 25 including means for modifying the predetermined range, with said means including means for monitoring the voltage, and means for temporarily modifying the predetermined range in response to the voltage monitoring means detecting a predetermined voltage increase over a predetermined period of time, wherein a greater rate of change of the reactance is required during the temporary modification in order for the fourth means to provide a trip signal.

28. The apparatus of claim 25 wherein the first means provides the voltage and current signals in digital form, at a predetermined sampling rate, the second means provides indications of the apparent reactance at the predetermined sampling rate, and the third means provides a signal responsive to the rate of change of the apparent reactance by detecting the change in reactance from one determination thereof to the next.

* * * * *